A. T. BROWN.
GEARING.
APPLICATION FILED APR. 13, 1901.

909,984.

Patented Jan. 19, 1909.
4 SHEETS—SHEET 2.

WITNESSES:
Chas. H. Young.
J. Davis.

INVENTOR
Alexander T. Brown
BY
Arthur E. Parsons
ATTORNEY

A. T. BROWN.
GEARING.
APPLICATION FILED APR. 13, 1907.

909,984.

Patented Jan. 19, 1909.

WITNESSES:

INVENTOR
Alexander T. Brown
BY
Arthur E. Parsons
ATTORNEY

UNITED STATES PATENT OFFICE.

ALEXANDER T. BROWN, OF SYRACUSE, NEW YORK.

GEARING.

No. 909,984.

Specification of Letters Patent.

Patented Jan. 19, 1909.

Application filed April 13, 1907. Serial No. 368,108.

*To all whom it may concern:*

Be it known that I, ALEXANDER T. BROWN, of Syracuse, in the county of Onondaga and State of New York, have invented a certain new and useful Gearing, of which the following is a specification.

My invention has for its object the production of a gearing which is applicable for use in motor-vehicles and other apparatus to effect changes of speed, and is particularly simple in construction and highly efficient in use; and to this end, it consists in the combinations and constructions hereinafter set forth and claimed.
In describing this invention, reference is had to the accompanying drawing in which like characters designate corresponding parts in all the views.

This gearing comprises generally a rotary element, a plurality of revoluble members, as gears, shiftable independently of each other into and out of connection with the rotary element, and means for selecting and shifting any one of the revoluble members.

In the illustrated embodiment of my invention, 1 is a case provided with a removable top or cover, and 2, 3 and 4 are rotary shafts journaled in the case, and provided with suitable revoluble members, as gears 5, 6, 7, 8, 9, 10 and 11, the shafts 2 and 3 being disposed in axial alinement, and the shaft 4 being arranged parallel to the shafts 2 and 3. One end of the shaft 2 is arranged within the case 1 and is formed of angular cross-section, and the contiguous end of the shaft 3 is journaled in a lengthwise socket 12 in the shaft 2. The opposite ends of the shafts 3 and 2 project beyond the case 1 and are supported by suitable bearings carried by caps 13 and 14 screwing into openings 15 and 16 in opposing walls 17 and 18 of the case. The shaft 4 is arranged entirely within the case 1 and is journaled at its ends in bearings carried by caps 19 and 20 screwing into openings 21 and 22 in the walls 17 and 18. Opposing portions of the caps carried by each of the walls 17 and 18 are formed with cutouts 23 which receive a cylindrical part 24 of a locking member 25 screwing into, or otherwise removably fixed to, said wall, and consequently, said caps are prevented from undue detachment.

The bearings of the caps 13, 14, 19 and 20 for the shafts 2, 3 and 4 form no part of my present invention, and hence it is thought unnecessary to describe the same herein.

The revoluble members 5 and 6 slide axially on the end of angular cross-section of the shaft 2. These members 5 and 6 are of dissimilar diameter, the one 5 of smaller size being nearer the wall 17. Opposing sides of the members 5 and 6 are formed with hubs provided with annular grooves 26 and 27, and the opposite side of the member 5 is provided with a clutch-face 28. The member 7 is of smaller size than the member 5, is interposed between the end of the shaft 2 and the wall 17, is provided with a clutch-face 29 for coacting with the clutch-face 28 on the revoluble member 5, and is fixed to the shaft 3 by suitable locking means, as rivets 30, (shown by dotted lines in Fig. 1) which enter grooves 31 extending lengthwise of the shaft 3 in the inner face of the member 7 and in the periphery of the contiguous portion of the shaft 3.

Figures 1, 2:
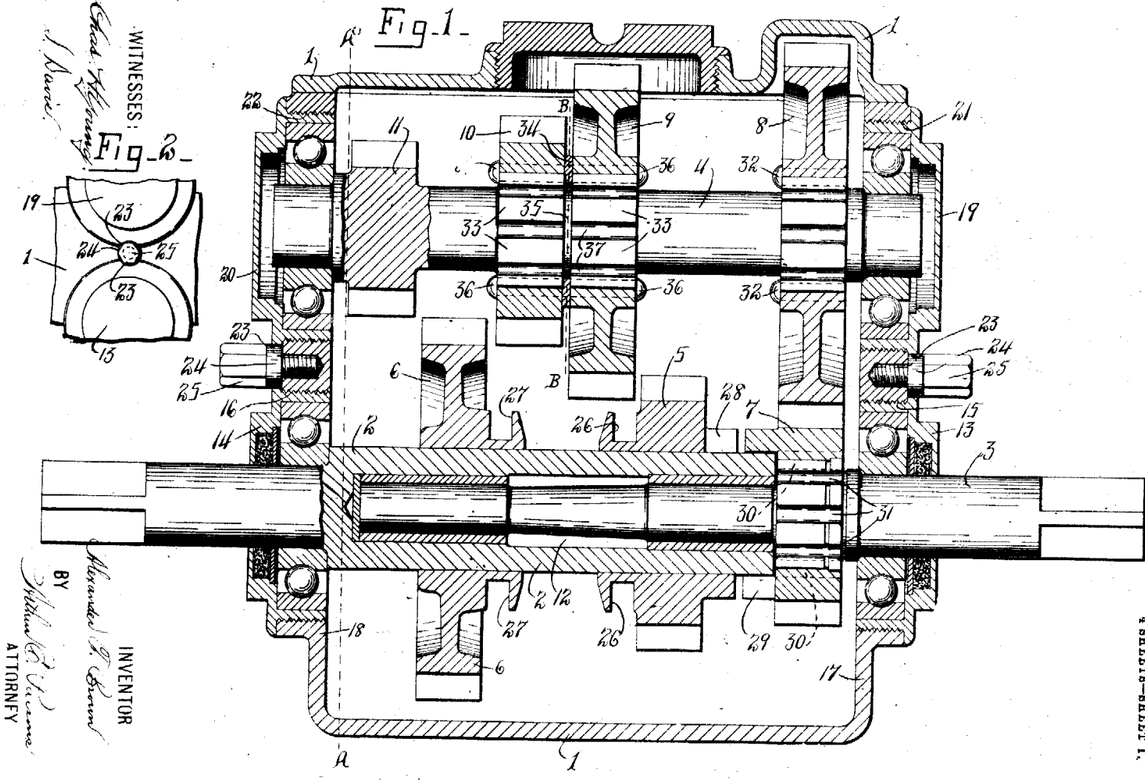
Figure 1 is a sectional view, partly in elevation, of my gearing.
Fig. 2 is a fragmentary view of a portion of the case.
Figure 3:
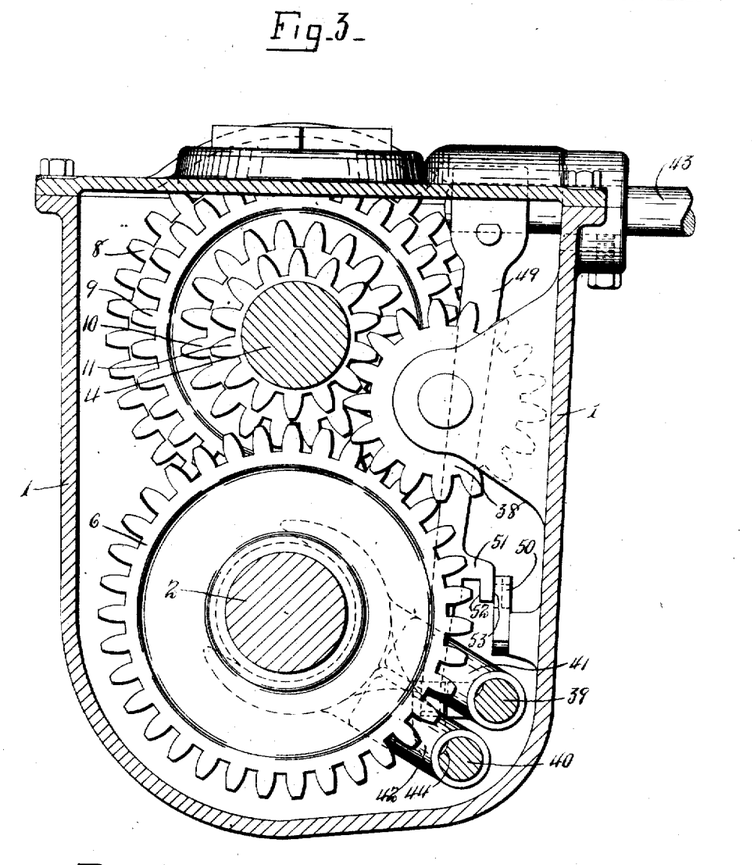
Figs. 3 and 4 are sectional views on lines A—A and B—B, Fig. 1.
Figure 4:
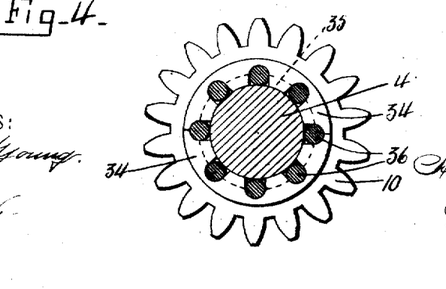

As clearly seen in Fig. 1, the revoluble member 8 is constantly engaged with the member 7, and is suitably fixed to the shaft 4, as by rivets 32, arranged within grooves formed in the opposing surfaces of the member 8 and the shaft 4 and extending lengthwise of the axis of said shaft. The revoluble members 9 and 10, which are of less diameter than the member 8, coact, respectively, with the members 5 and 6, and are mounted upon an enlargement 33 of the shaft 4 and bear against opposite sides of a sectional washer 34, Figs. 1 and 4, which is seated in a circular groove 35 formed in the enlargement 33 between the ends thereof. Rivets 36 are arranged in grooves 37 extending lengthwise of the enlargement 33 from opposite sides of the circular groove 35, and in corresponding grooves formed in the internal faces of the members 9 and 10 and registering with the grooves 37. The revoluble member 11 is of less diameter than the members 9 and 10, is integral with the shaft 4, and is formed of less diameter than the opening 22 for permitting endwise movement of said shaft 4 when assembling or removing the same. Said member 11 constantly meshes with an intermediate revoluble member 38, Fig. 3, suitably journaled within the case 1 and adapted to be engaged by the member 6.

The shaft 4, and the revoluble members 8, 9, 10, 11 and 38 form a rotary power-transmitting element, and the members 5 and 6 are shiftable independently of each other into and out of connection with such element. Although the illustrated construction and arrangement of said element and shiftable revoluble members are particularly suitable for use with the remaining parts of my gearing, it will be understood by those skilled in the art that any other suitable rotary element and shiftable revoluble members may be used in said gearing.

The means for selecting and shifting any one of the revoluble members 5 and 6 preferably comprises a plurality of guide-rods, 39 and 40, suitably fixed within the case 1, forks 41 and 42 having elongated cylindrical bearing portions or hubs slidable on the rods 39 and 40, and also having portions thereof mounted respectively in the grooves 26 and 27 of the revoluble members 5 and 6, a rock-shaft 43 extending through the wall of the case 1, means for connecting the rock-shaft 43 alternately to the forks 41 and 42, and for controlling the movement of the rock-shaft, and operating means for moving said rock-shaft axially, and for rocking the same about its axis.

Figures 7, 8, 9, 10:
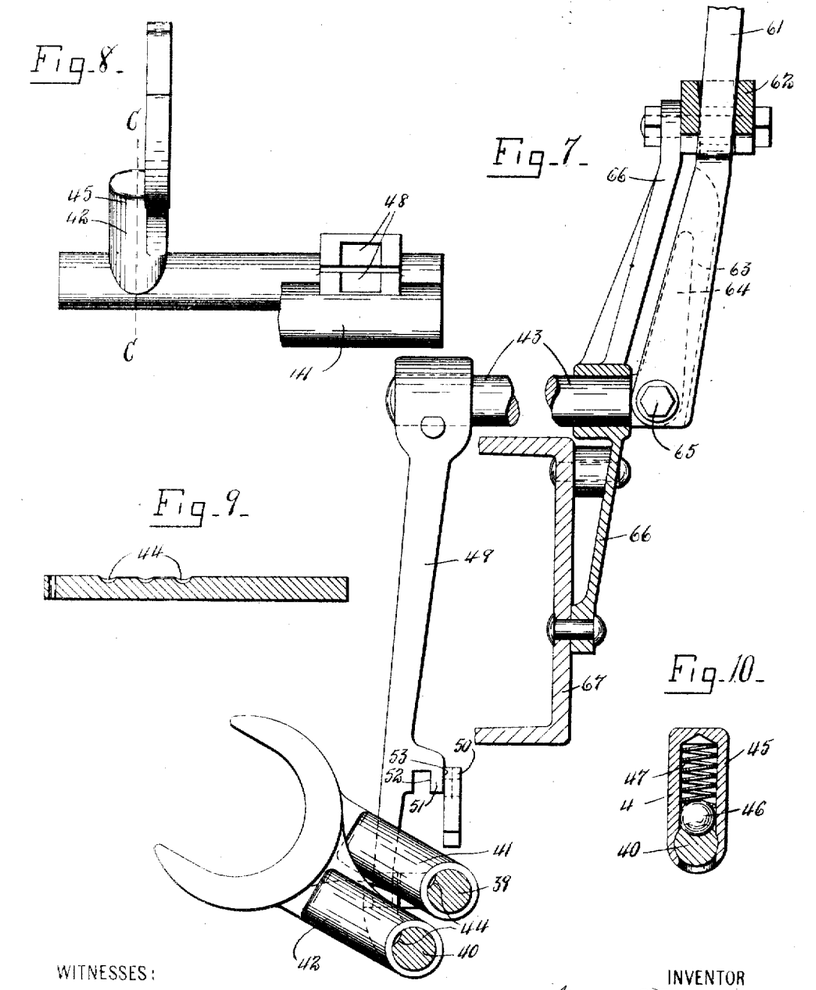
Fig. 7 is an end elevation, partly in section, of the parts seen in Fig. 5.
Fig. 8 is a detail view of one of the forks, and a part of the bearing portion of the other fork.
Fig. 9 is a longitudinal sectional view of one of the guide-rods for the forks.
Fig. 10 is a sectional view on line C—C, Fig. 8.

In the preferable construction of my invention, the guide-rods 39 and 40 are provided with a plurality of indentations 44, Fig. 9, arranged one in advance of the other, and the passages through the cylindrical bearing portions of the forks 41 and 42 are formed with lateral branches 45 containing holding-members, as balls 46, and also springs 47 tending to force the balls 46 into the indentations 44. Said indentations 44 and holding-members 46 facilitate the desired positioning of the forks 41 and 42 and prevent lateral displacement of said forks. Opposing surfaces of the bearing portions or hubs of the forks 41 and 42 are provided with engaging means, as sockets 48, preferably spaced apart from each other, the socket on one fork being arranged opposite to the socket on the other fork, when the revoluble members 5 and 6 are in their neutral position, and the opposing sides, and upper ends, of both sockets being open.

Figures 5, 6:
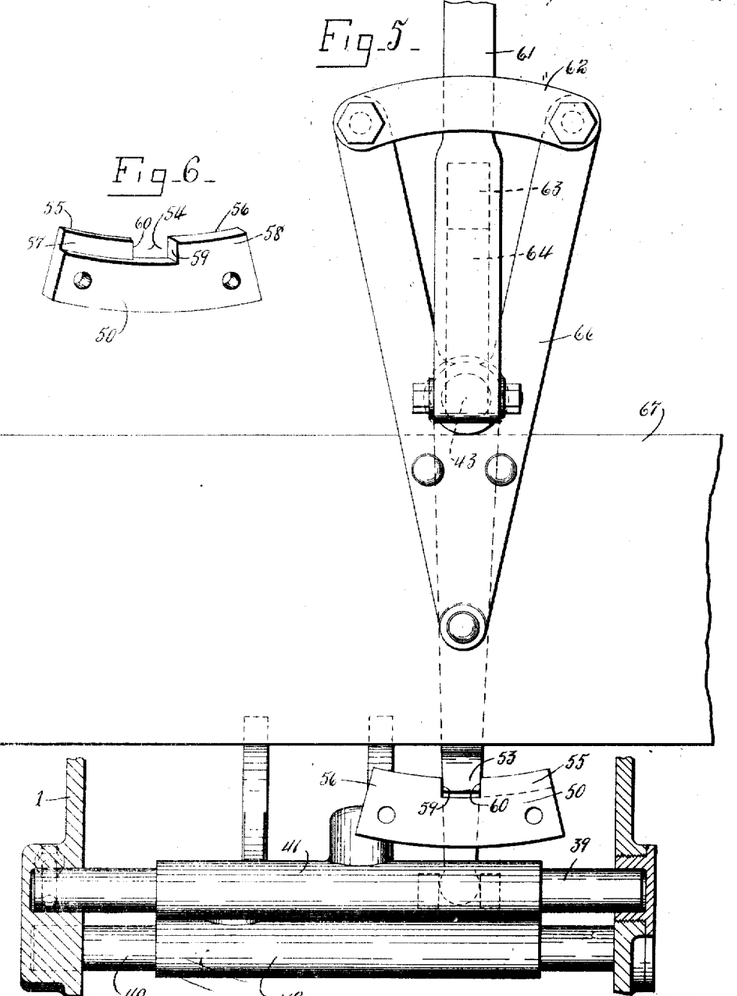
Fig. 5 is a fragmentary view illustrating the means for selecting and shifting any one of the revoluble members or gears, the contiguous part of the frame of a motor-vehicle being also shown.
Fig. 6 in an isometric view of the detached guide-member illustrated in Fig.
30 5.

The means for connecting the rock-shaft 43 to the forks 41 and 42, and for controlling the movement of said rock-shaft consists, in the illustrated construction of my invention, of a rocking-arm 49 and a guide-member 50. Said arm 49 is fixed at one end to the rock-shaft 43, and is movable with said rock-shaft and within the case 1. The other end of the arm 49 moves freely in a direction lengthwise of the rock-shaft 43 into and out of operative engagement with the sockets 48 of the forks 41 and 42, to select the predetermined fork, and also moves in an arc in a direction disposed at an angle to the first-mentioned movement, to shift the selected fork. This arm 49 is preferably provided with a lateral extension 51 having engaging surfaces 52 and 53 spaced apart from each other, and here shown as formed on opposite sides of a depending part of the extension 51. The guide-member 50, Fig. 6, is in the form of a segment and is provided with a passage 54 which extends through the top edge and the upper portions of the opposite lengthwise faces of the segment substantially midway between the ends thereof, and is adapted to receive the lateral extension 51 of the arm 49. One of the lengthwise faces of the guide-member 50 is provided with surfaces 55 and 56 arranged in the same vertical plane, and at opposite sides of the passage 54, and the other lengthwise face of said member is provided with surfaces 57 and 58 spaced apart unequal distances from the plane of the surfaces 55 and 56, and also arranged at opposite sides of the passage 54. One wall 59 of the passage 54 thus extends laterally beyond the opposing wall 60 of said passage. I do not, however, limit my gearing to the arrangement of the surfaces 52, 53, 55, 56, 57 and 58 herein set forth, as the same may, obviously, be modified more or less without departing from the spirit of my invention.

In the use of my gearing, the lateral extension 51 is alined with the passage 54 when the revoluble members 5 and 6 are in their neutral position; the surface 52 of the extension 51 is respectively engaged with the surfaces 55 and 56 of the guide-member 50 when the revoluble member 5 is shifted to effect high, and intermediate, speeds; and the surface 53 of said extension is respectively engaged with the surfaces 57 and 58 of said guide-member when the revoluble member 6 is shifted to effect low speed, and reverse motion. When the extension 51 is moved along the surface 57 and alined with the passage 54 for shifting the revoluble member 6 from its position assumed in effecting low speed, to its neutral position, said extension, at the limit of such movement, engages the wall 59 of the passage 54, and is thereby prevented from further movement lengthwise of the guide-member 50, until first moved laterally out of engagement with the wall 59. It is thus apparent that the wall 59 facilitates the finding of the neutral position of the arm 49 when the gear 6 is shifted from its position assumed to effect low speed, and also prevents the engagement of the revoluble members 6 and 11, effecting reverse motion, until the arm 49 is moved laterally out of engagement with the wall 59.

To those skilled in the art it will be apparent that the guide-member 50 is protected from dust and dirt, is in close proximity to the forks 41 and 42, and is subjected to minimum wear, and that any distortion of the frame does not affect the guiding or controlling of the rock-shaft 43.

The operating means for the rock-shaft 43 consists of a lever 61 and a guide 62, the lever 61 being provided with a channel 63 receiving an arm 64 projecting from the rock-shaft 43, and being connected to said rock-shaft by a pivot 65 extending crosswise of the rock-shaft. The guide 62 is spaced apart from the rock-shaft 43 above the guide-member 50, extends in the same general direction as the guide-member 50, is independent of said member 50 and is mounted upon a suitable support, as an arm 66, fixed to the frame 67 of the motor-vehicle, and also serving as a support for one end of the rock-shaft 43. This guide preferably consists of bars spaced apart and arranged at opposite sides of the lever 61 at a point intermediate of the ends of said lever, the surfaces of said bars along which the lever 61 is movable being spaced apart a uniform distance throughout their length.

In the shifting of my gearing, the lever 61 rocks upon the opposing surfaces of the bars, forming the guide 62, as a fulcrum, and thus moves the rock-shaft 43 axially for forcing the arm 49 into engagement with one of the forks 41 and 42, to select the predetermined revoluble member which it is desired to shift. The lever 61 then swings along the guide 62 about the axis of the rock-shaft 43, to shift the selected member. Reverse movements of the lever 61 return the selected member to its neutral position and disconnect the rock-shaft 43, or rather the arm 49, from the fork previously coacting therewith.

What I claim is:—

1. In a gearing, a rotary element, a plurality of revoluble members shiftable independently of each other into and out of connection with the rotary element, and means for selecting and shifting any one of the revoluble members, said means including a single crank-arm common to all of said revoluble members and a lever connected to the crank-arm and movable in one direction on a fulcrum, to select the predetermined member, and movable in another direction about an axis spaced apart from the fulcrum, to shift the selected member, substantially as and for the purpose described.

2. In a gearing, a rotary element, a plurality of revoluble members shiftable independently of each other into and out of connection with the rotary element, and means for selecting and shifting any one of the revoluble members, said means including shifting devices having opposing surfaces thereof provided with engaging means, a member common to all of the shifting devices and coacting with said engaging means respectively; a lever, and a pivotal connection between said member and the lever, said lever being movable in one direction on a fulcrum spaced apart from the pivotal connection for moving said pivotal connection laterally, to select the predetermined revoluble member, and said lever being movable in another direction about an axis, to shift the selected member, substantially as and for the purpose specified.

3. In a gearing, a rotary element, a plurality of revoluble members shiftable independently of each other into and out of connection with the rotary element, and means for selecting and shifting any one of the revoluble members, said means including a guide, a lever movable relatively to the guide in one direction to select the predetermined member, and movable in another direction along the guide about an axis spaced apart from the guide, to shift the selected member, and a second guide independent of the first-mentioned guide and extending in the same general direction as said first-mentioned guide, the second guide controlling movement of the lever relatively to the first-mentioned guide, substantially as and for the purpose set forth.

4. In a gearing, a rotary element, a plurality of revoluble members shiftable independently of each other into and out of connection with the rotary element, and means for selecting and shifting any one of the revoluble members, said means including a lever, a guide coacting with the lever intermediate of the ends of the lever, said lever being movable on the guide as a fulcrum, to select the predetermined member, and being movable along the guide about an axis spaced apart from the guide, to shift the selected member, and a second guide beneath the first-mentioned guide and extending in the same general direction as said first-mentioned guide, the second guide controlling movement of the lever relatively to the first-mentioned guide, substantially as and for the purpose described.

5. In a gearing, a rotary element, a plurality of revoluble members shiftable independently of each other into and out of connection with the rotary element, and means for selecting and shifting any one of the revoluble members, said means including a guide composed of bars spaced apart, a lever interposed between the bars, said lever being movable on the opposing surfaces of the bars as a fulcrum, to select the predetermined member, and being movable along said surfaces about an axis spaced apart from the guide, to shift the selected member, said surfaces extending lengthwise of the bars and being spaced a uniform distance apart throughout their length, and means independent of the guide for controlling movement of the lever relatively to said guide, substantially as and for the purpose specified.

6. In a gearing, a rotary element, a plurality of revoluble members shiftable independently of each other into and out of connection with the rotary element, a case for inclosing said element and members and means for selecting and shifting any one of the revoluble members, said means including an axially-movable rock-shaft, a member common to all of said revoluble members and movable in the case by the rock-shaft, and means for moving the rock-shaft axially, to select the predetermined revoluble member, and for moving the rock-shaft about its axis, to shift the selected member, substantially as and for the purpose set forth.

7. In a gearing, a rotary element, a plurality of revoluble members shiftable independently of each other into and out of connection with the rotary element, and means for selecting and shifting any one of the revoluble members, said means including an axially-movable rock-shaft, a member common to all of said revoluble members and movable by the rock-shaft, a lever connected to the rock-shaft, a guide for the lever spaced apart from the rock-shaft, the lever being movable relatively to the guide for moving the rock-shaft axially, to select the predetermined revoluble member, and being movable along the guide about an axis for oscillating said rock-shaft, to shift the selected member, and fixed means coacting with said member movable by the rock-shaft and thereby controlling movement of the lever substantially as and for the purpose described.

8. In a gearing, a rotary element, a plurality of revoluble members shiftable independently of each other into and out of connection with the rotary element, a case for inclosing said element and members and means for selecting and shifting any one of the revoluble members, said means including an axially-movable rock-shaft, projecting into the case, a member common to all of said revoluble members and movable in the case by the rock-shaft, a lever, a pivot connecting the rock-shaft and the lever and extending crosswise of the rock-shaft, and a fulcrum for the lever spaced apart from the rock-shaft, the lever being movable on the fulcrum for moving the rock-shaft axially, to select the predetermined member, and being movable about the axis of the rock-shaft for oscillating said rock-shaft, to shift the selected member, substantially as and for the purpose specified.

9. In a gearing, a rotary element, a plurality of revoluble members shiftable independently of each other into and out of connection with the rotary element, a case for inclosing said element and members and means for selecting and shifting any one of the revoluble members, said means including an axially-movable rock-shaft, projecting into the case, a member within the case fixed to the rock-shaft and common to all of said revoluble members, a lever pivotally connected to the rock-shaft, a guide coacting with the lever intermediate of the ends of the lever, said lever being movable on the guide as a fulcrum for moving the rock-shaft axially, to select the predetermined revoluble member, and being movable along the guide about the axis of the rock-shaft for oscillating said rock-shaft, to shift the selected member, and means coacting with said member fixed to the rock-shaft and thereby controlling movement of the lever, substantially as and for the purpose set forth.

10. In a gearing, a rotary element, a plurality of revoluble members shiftable independenly of each other into and out of connection with the rotary element, and means for selecting and shifting any one of the revoluble members, said means including an operating lever, a movable part actuated by the operating lever, and a fixed guide-member coacting with said movable part for controlling the movement thereof, substantially as and for the purpose described.

11. In a gearing, a rotary element, a plurality of revoluble members shiftable independenly of each other into and out of connection with the rotary element, and means for selecting and shifting any one of the revoluble members, said means including an operating lever, a part actuated by the operating lever and movable in two directions disposed at an angle to each other, and a fixed guide-member coacting with said part for controlling the movement thereof, substantially as and for the purpose specified.

12. In a gearing, a rotary element, a plurality of revoluble members shiftable independently of each other into and out of connection with the rotary element, a case for inclosing said element and members, and means for selecting and shifting any one of the revoluble members, said means including a part movable within the case, and a guide-member within the case coacting with said part for controlling the movement thereof, substantially as and for the purpose set forth.

13. In a gearing, a rotary element, a plurality of revoluble members shiftable independently of each other into and out of connection with the rotary element, a case for inclosing said element and members, and means for selecting and shifting any one of the revoluble members, said means including a part movable within the case in two directions disposed at an angle to each other, and a guide-member within the case coacting with said part for controlling the movement thereof, substantially as and for the purpose described.

14. In a gearing, a rotary element, a plurality of revoluble members shiftable independently of each other into and out of connection with the rotary element, a case for inclosing said element and members, and means for selecting and shifting any one of the revoluble members, said means including a part movable within the case and having engaging surfaces spaced apart, and a guide-member within the case having engaging surfaces on opposite faces for coacting with the first-mentioned engaging surfaces to control the movement of said part, the guide-member being provided with a passage extending through said opposite faces thereof, substantially as and for the purpose specified.

15. In a gearing, a rotary element, a plurality of revoluble members shiftable independently of each other into and out of connection with the rotary element, a case for inclosing said element and members, and means for selecting and shifting any one of the revoluble members, said means including a part movable within the case and having engaging surfaces spaced apart, and a guide-member within the case having engaging surfaces on opposite faces for coacting with the first-mentioned engaging surfaces to control the movement of said part, the guide-member being provided with a passage extending through said opposite faces thereof, one wall of said passage extending laterally beyond one of the engaging surfaces of the guide-member, substantially as and for the purpose set forth.

16. In a gearing, a rotary element, a plurality of revoluble members shiftable independently of each other into and out of connection with the rotary element, a case for inclosing said element and members, and means for selecting and shifting any one of the revoluble members, said means including a part movable in reverse directions in an arc and also axially, within the case, and a guide-member fixed within the case and coacting with said part for controlling the movement thereof, substantially as and for the purpose described.

17. In a gearing, a rotary element, a plurality of revoluble members shiftable independently of each other into and out of connection with the rotary element, a case for inclosing said element and members, and means for selecting and shifting any one of the revoluble members, said means including a rocking-part movable within the case and having a lateral extension formed with engaging surfaces spaced apart, and a guide-member fixed within the case and having engaging surfaces on opposite faces for coacting with the first-mentioned engaging surfaces to control the movement of said part, the guide-member being provided with a passage extending through said opposite faces thereof for receiving the lateral extension of the rocking-part, one wall of said passage extending laterally beyond one of the engaging surfaces of the guide-member, substantially as and for the purpose specified.

18. In a gearing, a rotary element, a plurality of revoluble members shiftable independently of each other into and out of connection with the rotary element, a case for inclosing said element and members, and means for selecting and shifting any one of the revoluble members, said means including a rock-shaft, a part actuated by the rock-shaft and movable within the case, operating means for the rock-shaft, and a guide-member within the case coacting with said part for controlling the movement thereof, substantially as and for the purpose set forth.

19. In a gearing, a rotary element, a plurality of revoluble members shiftable independently of each other into and out of connection with the rotary element, a case for inclosing said element and members, and means for selecting and shifting any one of the revoluble members, said means including an axially-movable rock-shaft, a part movable with the rock-shaft and within the case, a lever pivotally connected to the rock-shaft, a fulcrum for the lever spaced apart from the rock-shaft, the lever being movable on the fulcrum for moving the rock-shaft axially, to select the predetermined member, and being movable about the axis of the rock-shaft for oscillating said rock-shaft, to shift the selected member, and a guide-member within the case coacting with said part movable with the rock-shaft for controlling the movement thereof, substantially as and for the purpose described.

20. In a gearing, a rotary element, a plurality or revoluble members shiftable independently of each other into and out of connection with the rotary element, a case for inclosing said element and members, and means for selecting and shifting any one of the revoluble members, said means including an axially-movable rock-shaft, a part movable with the rock-shaft and within the case, said part having engaging surfaces spaced apart, a lever pivotally connected to the rock-shaft, a guide coacting with the lever intermediate of the ends of the lever, the guide being spaced apart from the rock-shaft, said lever being movable on the guide as a fulcrum for moving the rock-shaft axially, to select the predetermined member, and being movable about the axis of the rock-shaft along the guide for oscillating said rock-shaft, to shift the selected member, and a guide-member within the case having engaging surfaces on opposite faces for coacting with the first-mentioned engaging surfaces to control the movement of said part movable with the rock-shaft, the guide-member being provided with a passage extending through said opposite faces thereof, substantially as and for the purpose specified.

21. In a gearing, a rotary element, a revoluble member shiftable into and out of connection with the rotary element, a case for inclosing said element and member, a rod fixed within the case and formed with indentations, a fork slidable on the rod and connected to the revoluble member, a holding-member carried by the fork and coacting with the indentations, and means for actuating the fork, substantially as and for the purpose set forth.

22. In a gearing, a rotary element, a plurality of revoluble members shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, and means for actuating the forks, substantially as and for the purpose described.

23. In a gearing, a rotary element, a plurality of revoluble members shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, said forks having engaging means, and a part movable within the case into and out of engagement with said engaging means of the forks, substantially as and for the purpose specified.

24. In a gearing, a rotary element, a plurality of revoluble members shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, said forks having engaging means, the engaging means of one fork being opposed to the engaging means of the other fork, and a part movable within the case in one direction into engagement with the engaging means of one of the forks, and movable in another direction for shifting said one of the forks, substantially as and for the purpose set forth.

25. In a gearing, a rotary element, a plurality of revoluble members shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, said forks having engaging means, a rock-shaft, a part movable with the rock-shaft and within the case and coacting with the engaging means of the forks, and means for moving the rock-shaft axially, to select the predetermined member, and for moving the rock-shaft about its axis, to shift the selected member, substantially as and for the purpose described.

26. In a gearing, a rotary element, a plurality of revoluble members, shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, said forks having engaging means, an axially-movable rock-shaft, a part movable with the rock-shaft and within the case and coacting with the engaging means of the forks, a guide-member within the case coacting with said part for controlling the movement thereof, and means for moving the rock-shaft axially, to select the predetermined member, and for moving the rock-shaft about its axis, to shift the selected member, substantially as and for the purpose specified.

27. In a gearing, a rotary element, a plurality of revoluble members shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, said forks having engaging means, an axially-movable rock-shaft, a part movable with the rock-shaft and within the case and coacting with the engaging means of the forks, a lever pivotally connected to the rock-shaft, a guide coacting with the lever intermediate of the ends of the lever, the guide being spaced apart from the rock-shaft, said lever being movable on the guide as a fulcrum for moving the rock-shaft axially, to select the predetermined member, and being movable about the axis of the rock-shaft along the guide for oscillating said rock-shaft, to shift the selected member, and a guide-member within the case coacting with said part movable with the rock-shaft for controlling the movement thereof, substantially as and for the purpose set forth.

28. In a gearing, a shaft having an enlargement formed with a circular groove between its ends and with lengthwise grooves extending from opposite sides of the circular groove, a sectional washer seated in the circular groove, a pair of gears mounted on the enlargement of the shaft and bearing against opposite sides of the washer, said gears being formed with internal grooves registering with the lengthwise grooves of the enlargement, and holding means within said lengthwise grooves, substantially as and for the purpose described.

29. In a gearing, a case having openings, a pair of shafts, caps for the openings provided with bearings for the shafts, opposing portions of the caps being provided with cutouts, and a locking member removably fixed to the case and having a part thereof arranged within said cutouts, substantially as and for the purpose specified.

30. In a gearing, a rotary element, a plurality of revoluble members shiftable independently of each other into and out of connection with the rotary element, a case for inclosing said element and members and means for selecting and shifting any one of the revoluble members, said means including a lever movable in two directions, a member common to all of the revoluble members movable to select one of the same, in one movement of the lever, and movable to shift the member selected in the other movement of the lever, and guiding means carried by the case and controlling movement of the lever, substantially as and for the purpose specified.

31. In a gearing, a rotary element, two revoluble members shiftable independently of each other into and out of connection with the rotary element, a shifting-device associated with each of the revoluble members, supporting means for the shifting devices and means for selecting and shifting either of said shifting-devices, said means including a lever movable in two directions, a member common to both of said shifting-devices movable to select one or the other of the same in one movement of the lever, and movable to shift the device selected in the other movement of the lever, and means fixed relatively to said supporting means and controlling movement of the lever, substantially as and for the purpose described.

32. In a gearing, a rotary element, two revoluble members shiftable independently of each other into and out of connection with the rotary element, two shifting-devices movable in substantially parallel planes and connected respectively to said revoluble members, supporting means for the shifting devices and means for selecting and shifting either one of said shifting-devices including a lever movable in two directions, a member common to both of said shifting devices movable to select one or the other of the same in one movement of the lever, and movable to shift the device selected in the other movement of the lever, and means fixed relatively to said supporting means and coacting with the member common to the shifting devices and thereby controlling movement of the lever, substantially as and for the purpose set forth.

33. In a gearing, a rotary element, two revoluble members shiftable independently of each other into and out of connection with the rotary element, two shifting-devices coöperating respectively with said revoluble members, means for selecting and shifting either of said shifting devices, said means including a lever movable in one direction on a fulcrum, and movable in another direction about an axis spaced apart from the fulcrum, a member common to both of the shifting devices having an end for coöperation with said shifting devices and movable to select one or the other of the same in the first movement of the lever, and movable in another direction to shift the device selected in the second movement of the lever, and a guide-member coöperating with the last-named member adjacent the end thereof which coöperates with the shifting devices, substantially as and for the purpose specified.

34. In a gearing, a rotary element, a plurality of revoluble members shiftable independently of each other into and out of connection with the rotary element, two shifting devices movable in substantially parallel planes and coacting respectively with the two revoluble members, rods for supporting the shifting devices, supporting means for the rods and means for selecting and shifting either of the shifting devices, said means including a lever movable in two directions, a member common to both of the shifting devices and adapted to singly engage either of the same, said member being movable to select one or the other of the devices to be shifted in one movement of the lever and movable to shift the device selected in the other movement of the lever, and means fixed relatively to the supporting means for the rods and controlling movement of the lever, substantially as and for the purpose described.

35. In a gearing, a rotary element, a plurality of revoluble members shiftable independently of each other into and out of connection with the rotary element, two shifting-devices movable in substantially parallel planes and coacting respectively with the two revoluble members, and means for selecting and shifting either of the shifting-devices, said means including a lever movable in one direction on a fulcrum, and movable in another direction about an axis spaced apart from the fulcrum, a member common to both of the shifting devices having an end adapted to singly engage therewith, said member being movable to select one or the other of the devices to be shifted in the first movement of the lever and movable to shift the device selected in the second movement of the lever, and a fixed guide-element coacting with the last-mentioned member adjacent the end thereof, substantially as and for the purpose set forth.

36. In a gearing, a rotary element, a plurality of revoluble members shiftable independently of each other into and out of connection with the rotary element, a case for inclosing said element and members, and means for selecting and shifting any one of the revoluble members, said means including forks slidable independently within the case and connected to the revoluble members, fixed means within the case upon which the forks are slidable, and means for actuating the forks, substantially as and for the purpose set forth.

37. In a gearing, a rotary element, a plurality of revoluble members shiftable independently of each other into and out of connection with the rotary element, a case for inclosing said element and members, and means for selecting and shifting any one of the revoluble members, said means including forks slidable independently within the case and connected to the revoluble members, fixed means within the case upon which the forks are slidable, a part movable within the case for actuating the forks, means fixed relatively to the case for controlling the movement of said part, and means for actuating the forks, substantially as and for the purpose described.

38. In a gearing, a rotary element, a plurality of revoluble members shiftable independently of each other into and out of connection with the rotary element, a case for inclosing said element and members, and means for selecting and shifting any one of the revoluble members, said means including forks slidable independently within the case and connected to the revoluble members, fixed means within the case upon which the forks are slidable, means for holding the forks in their adjusted position on said fixed means, and means for actuating the forks, substantially as and for the purpose specified.

39. In a gearing, a rotary element, a plurality of revoluble members shiftable independently of each other into and out of connection with the rotary element, a case for inclosing said element and members, and means for selecting and shifting any one of the revoluble members, said means including forks slidable independently within the case and connected to the revoluble members, fixed means within the case upon which the forks are slidable, means carried by the forks and movable relatively thereto for holding the forks in their adjusted position on said fixed means, and means for actuating the forks, substantially as and for the purpose set forth.

40. In a gearing, a rotary element, a plurality of revoluble members shiftable independently of each other into and out of connection with the rotary element, a case for inclosing said element and members, and means for selecting and shifting any one of the revoluble members, said means including a plurality of rods fixed within the case, forks slidable on the rods and connected to the revoluble members, holding means carried by the forks and movable relatively thereto for holding the forks in their adjusted position on said rods, and means for actuating the forks, substantially as and for the purpose described.

In testimony whereof, I have hereunto signed my name in the presence of two attesting witnesses, at Syracuse, in the county of Onondaga, in the State of New York, this 5th day of April, 1907.

ALEXANDER T. BROWN.

Witnesses:
S. DAVIS,
R. ARONSON.